US008208851B2

(12) United States Patent
Kwak et al.

(10) Patent No.: US 8,208,851 B2
(45) Date of Patent: Jun. 26, 2012

(54) APPARATUS AND METHOD FOR RELAYING BETWEEN BASE STATION AND MOBILE STATION, AND METHOD FOR RECEIVING CONTROL INFORMATION

(75) Inventors: Byung-Jae Kwak, Seoul (KR); Dong-Seung Kwon, Daejeon (KR); Dong-Hyun Ahn, Daejeon (KR); Sung-Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 574 days.

(21) Appl. No.: 12/307,320

(22) PCT Filed: Jul. 3, 2007

(86) PCT No.: PCT/KR2007/003229
§ 371 (c)(1),
(2), (4) Date: Jan. 2, 2009

(87) PCT Pub. No.: WO2008/004806
PCT Pub. Date: Jan. 10, 2008

(65) Prior Publication Data
US 2009/0197624 A1    Aug. 6, 2009

(30) Foreign Application Priority Data

| Jul. 3, 2006 | (KR) | 10-2006-0061901 |
| Jul. 18, 2006 | (KR) | 10-2006-0066679 |
| Nov. 6, 2006 | (KR) | 10-2006-0109058 |
| Nov. 8, 2006 | (KR) | 10-2006-0109980 |

(51) Int. Cl.
*H04B 7/185*   (2006.01)
(52) U.S. Cl. ...................................... 455/13.1; 455/450

(58) Field of Classification Search .................. 455/11.1, 455/13.1, 452.2, 450
See application file for complete search history.

(56) References Cited

U.S. PATENT DOCUMENTS

| 7,486,928 B2 * | 2/2009 | Izumikawa et al. .......... 455/11.1 |
| 2003/0125067 A1 | 7/2003 | Takeda et al. |
| 2004/0127225 A1 * | 7/2004 | Qiu et al. ....................... 455/450 |
| 2004/0192204 A1 | 9/2004 | Periyalwar et al. |
| 2006/0209671 A1 | 9/2006 | Khan et al. |

OTHER PUBLICATIONS

IEEE C802.16j-06/147; IEEE 802.16 Broadband Wireless Access Working Group http://ieee802.org/16, submitted Nov. 7, 2006.
IEEE C802.16j-06/214; IEEE 802.16 Broadband Wireless Access Working Group http://ieee802.org/16, submitted Nov. 7, 2006.
IEEE C802.16j-07/101r7; IEEE 802.16 Broadband Wireless Access Working Group http://ieee802.org/16, submitted Mar. 15, 2007.
IEEE C802.16j-07/166; IEEE 802.16 Broadband Wireless Access Working Group http://ieee802.org/16, submitted Jan. 8, 2007.
IEEE C802.16j-06/072r1; IEEE 802.16 Broadband Wireless Access Working Group http://ieee802,org/16, submitted Jul. 14, 2006.

* cited by examiner

*Primary Examiner* — Tu X Nguyen
(74) *Attorney, Agent, or Firm* — Staas & Halsey LLP

(57) ABSTRACT

When an event associated with a mobile station occurs, a relay station requests a base station to allocate a dedicated control channel required for transmitting control information on the mobile station to the base station. Next, when the control information on the mobile station is generated, the relay station transmits the control information to the base station through the dedicated control channel. Accordingly, since the base station allocates the dedicated control channel to the relay station in advance before the control information is generated in the relay station, the relay station can transmit the control information to the base station with a minimum of time delay.

2 Claims, 10 Drawing Sheets

APPARATUS AND METHOD FOR RELAYING BETWEEN BASE STATION AND MOBILE STATION, AND METHOD FOR RECEIVING CONTROL INFORMATION

CROSS-REFERENCE TO RELATED APPLICATIONS

This application claims the benefit of International Application No. PCT/KR2007/003229, filed Jul. 3, 2007, Korean Patent Application No. 10-2006-0061901, filed Jul. 3, 2006, Korean Patent Application No. 10-2006-0066679, filed Jul. 18, 2006, Korean Patent Application No. 10-2006-0109058, filed Nov. 6, 2006, and Korean Patent Application No. 10-2006-0109980, filed Nov. 8, 2006, the disclosures of which are incorporated herein by reference.

TECHNICAL FIELD

The present invention relates to a relay station and a base station.

This work was supported by the IT R&D program of MIC/IITA[2006-S-011-1, Development of relay/mesh communication system for multi-hop WiBro].

BACKGROUND ART

Mobile multi-hop relay is abbreviated to MMR. Unlike a conventional mobile network, in an MMR network, a relay station (RS) is disposed between an MMR base station (MMR-BS) and mobile stations (MSs). The relay station (RS) relays data packets between the base station (MMR-BS) and mobile stations (MSs) if needed, so that performance of the MMR network can be improved.

Figure 1:
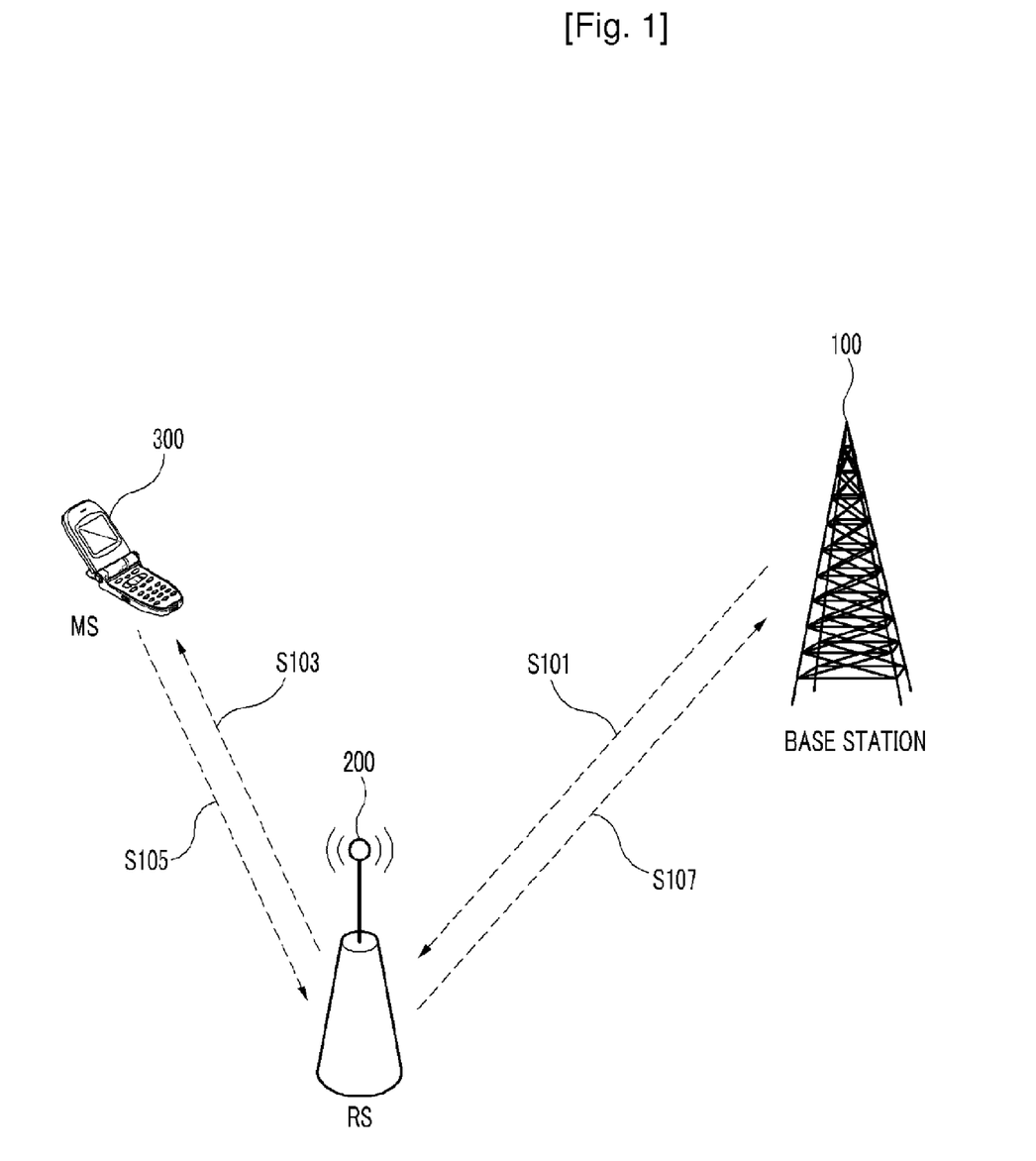
FIG. 1 is a view illustrating operations of a relay station.

FIG. 1 is a view illustrating operations of a relay station.

As shown in FIG. 1, a relay station 200 performs relaying between a base station 100 and a mobile station 300. When the relay station 200 receives a downlink signal from the base station 100 (S101), the relay station 200 transfers the downlink signal to the mobile station 300 (S103). In addition, when the relay station 200 receives an uplink signal from the mobile station 300 (S105), the relay station 200 transfers the uplink signal to the base station 100 (S107).

Due to the relaying of the relay station 200, data throughput can be improved and the cell coverage of a base station 100 can be extended. In addition, shadow areas can be removed, and emergency communication services can be provided. In addition, due to the relay station 200, in-vehicle communication service within a train, a bus, or the like can be provided.

In order to efficiently relay data packets between the base station 100 and the mobile station 300, the relay station 200 needs to transfer various types of control information, such as a various request messages from the mobile station 300 to the base station 100 as well as the information on the time-varying physical channel environment and topology between the relay station 200 and the mobile station 300, to the base station in a timely manner. In addition, the relay station 200 needs to efficiently transfer to the mobile station 300 various types of control information that the base station 100 is to transmit to the mobile station 300.

Figure 2:
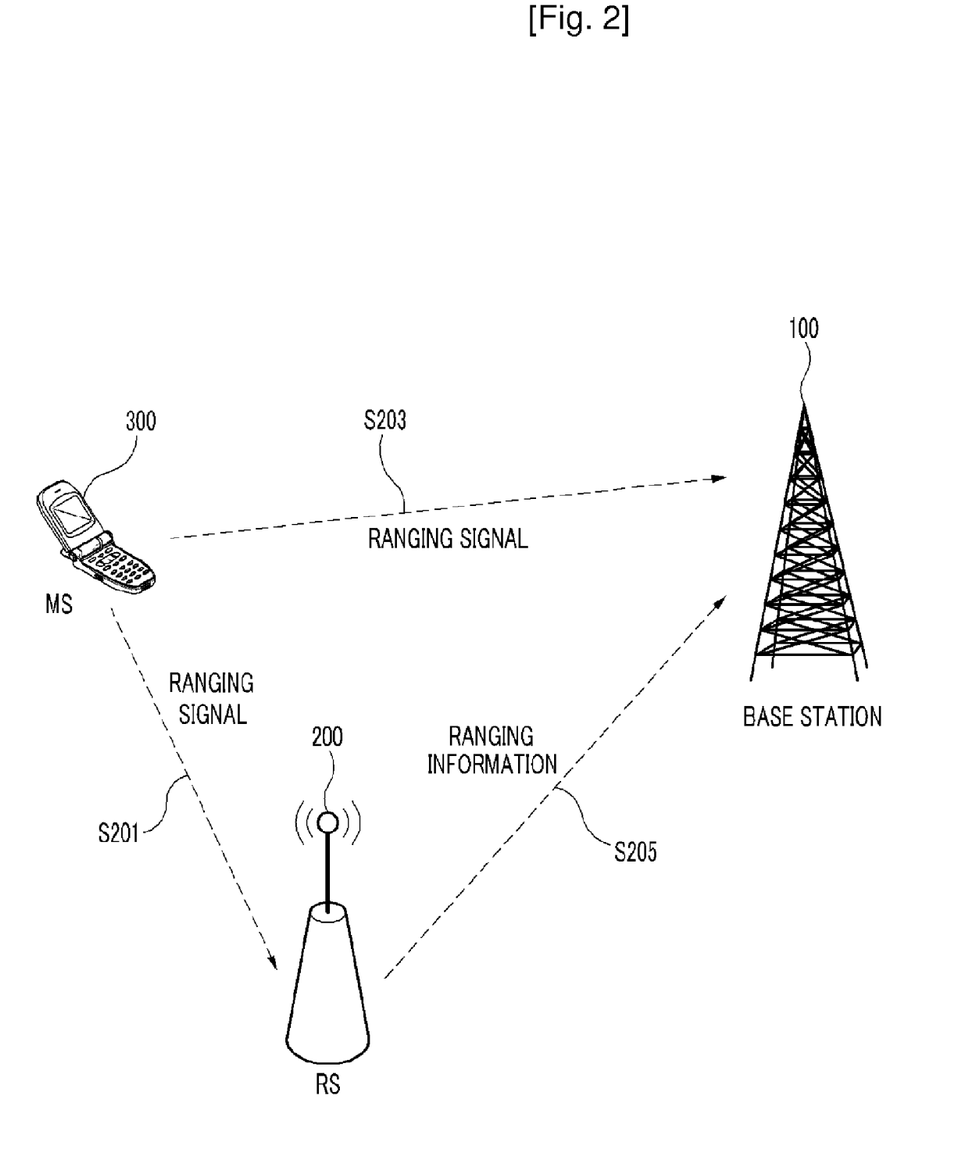
FIG. 2 is a view illustrating an example of an initial ranging attempt of a mobile station in an MMR network.
Figure 3:
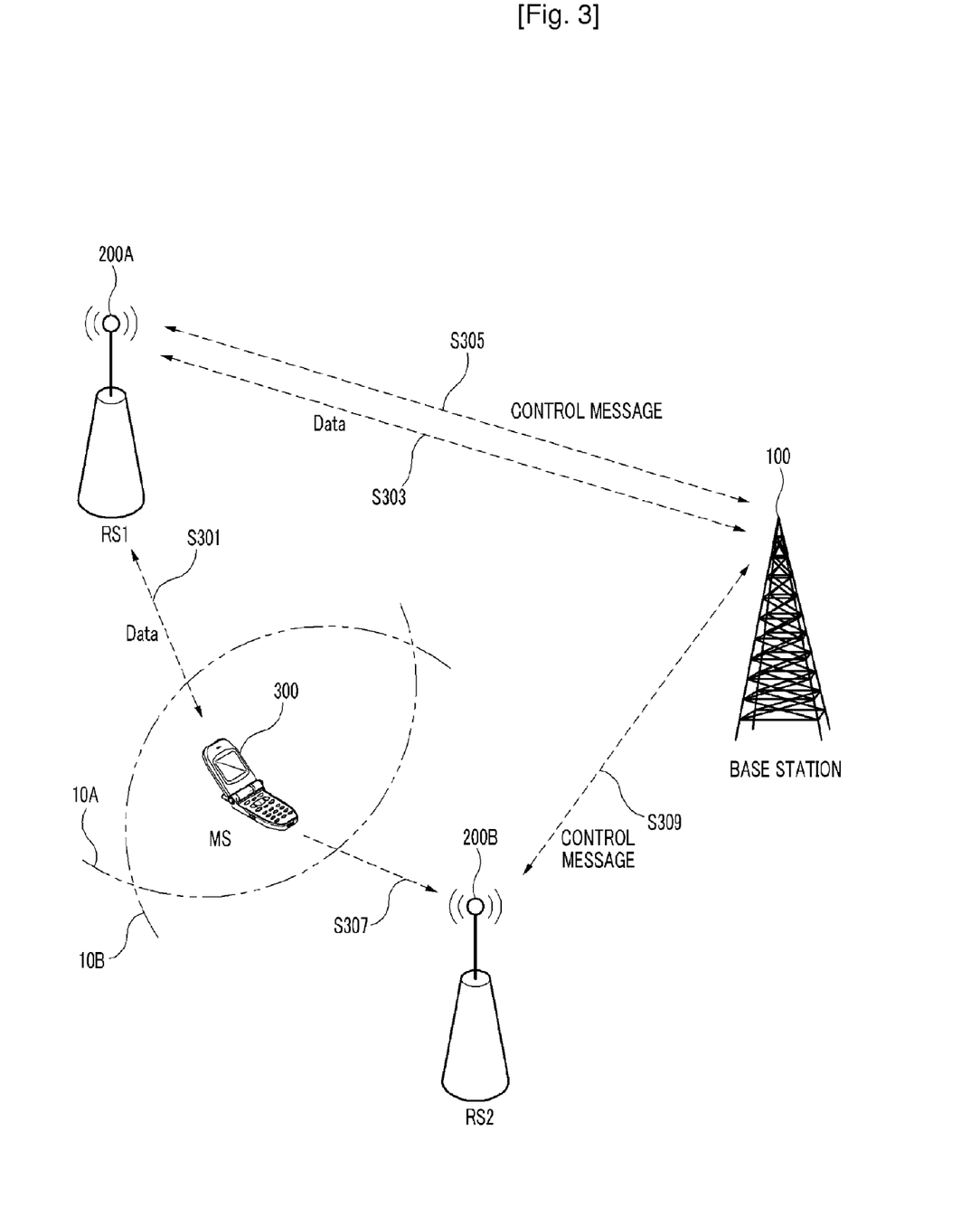
FIG. 3 is a view illustrating a case where a mobile station moves from a coverage area of one relay station to a coverage area of another relay station.

The control information that the relay station 200 should transmit to the base station 100 and receives from the base station 100 in order to perform the MMR function is described with references to FIGS. 2 and 3.

FIG. 2 is a view illustrating an example of an initial ranging attempt of the mobile station 300 in an MMR network.

In order for the mobile station 300 to register itself to an MMR network, the mobile station 300 transmits a ranging signal to notify the base station 100 of the existence of the mobile station 300 (S201 and S203). When the relay station 200 receives the ranging signal, the relay station 200 transfers the information on the ranging signal to the base station 100 (S205). The base station 100 may or may not receive the ranging signal depending on a position of the mobile station 300. If the base station 100 receives the ranging signal of the mobile station 300, the base station 100 processes the received ranging signal to obtain the ranging information and compares the information with the ranging information received from the relay station 200. If the base station 100 cannot receive the ranging signal of the mobile station 300, the base station 100 identifies the existence of the mobile station 300 based on the ranging information received from the relay station 200. The base station 100 analyzes the collected ranging information to determine whether the mobile station 300 is to communicate with the base station 100 through the relay station 200 or directly. According to the determination, the base station 100 allocates a resource to the mobile station 300 and transmits the control information to the mobile station 300. If the base station 100 directly receives the ranging information from the mobile station 300, the base station 100 waits for the information on the ranging signal that the relay station 200 receives from the mobile station 300 for a predetermined time interval. Therefore, in a case where the relay station 200 exists in a cell, similar to the mobile station 300 that communicates with the base station 100 through the relay station 200, the mobile stations that directly communicate with the base station 100 without the relay station 200 have to experience a longer delay for initial ranging process.

FIG. 3 is a view illustrating a case where a mobile station 300 moves from a coverage area 10A of one relay station 200A to a coverage area 10B of another relay station 200B.

In FIG. 3, two relay stations 200A and 200B are connected to one base station 100. Currently, the mobile station 300 is provided with a service by the relay station 200A (S301 and S303), and the mobile station 300 moves from the coverage area 10A of the relay station 200A to the coverage area 10B of the relay station 200B. When the relay station 200A receives a signal from the mobile station 300 (S301), the relay station 200A measures a reception power of the received signal and transmits information on the reception power to the base station 100 (S305). When the mobile station 300 enters the coverage area 10B of the relay station 200B, the relay station 200B is able to receive the signals from the mobile station 300 (S307) and measures the reception power of the received signal to transmit the information on the reception power to the base station 100 (S309). The base station 100 analyzes the information on the reception intensities received from the relay station 200A and the relay station 200B to det ermine which one of relay paths of the relay station 200A and the relay station 200B is better. If the mobile station 300 is closer to the relay station 200B, the relay station 200B may be determined to be the better relay path. In this case, the base station 100 may switch the relay path to the relay path of the relay station 200B. However, if the relay station 200A and the relay station 200B cannot transmit the information on variation of the reception intensities of the received signals to the base station 100 within a reasonably short time interval, the relay path switching cannot be performed efficiently.

As described with reference to FIGS. 2 and 3, in order to efficiently operate the MMR network, the relay station 200 needs to transmit and receive various types of control information with the base station 100. At this time, if a time delay occurs due to an inefficient transmission of the control information, performance of the MMR network may be degraded.

DISCLOSURE OF INVENTION

Technical Problem

The present invention has been made in an effort to provide a relaying method having advantages of being capable of efficiently transmitting control information.

Technical Solution

An exemplary embodiment of the present invention provides a relaying method of a first relay station that relays between a mobile station and a base station, wherein, when an event associated with the mobile station occurs, the first relay station requests the base station to allocate a resource required for transmitting control information on the mobile station to the base station, and when the control information on the mobile station is generated, the first relay station transmits the control information to the base station through the resource.

In the embodiment, the event may be the mobile station approaching the first relay station.

In addition, when the first relay station requests the base station to allocate the resource, the first relay station may request the base station to periodically allocate the resource.

Another embodiment of the present invention provides a control information receiving method of a base station that receives control information on a mobile station through relaying of a first relay station, wherein the base station polls the first relay station to receive a periodic resource allocation request of the first relay station, the base station allocates a first periodic resource to the first relay station, and the base station receives first control information on the mobile station through the first periodic resource from the first relay station.

In the embodiment, when the base station receives the first control information on the mobile station, the base station may receive ranging information of the mobile station. In addition, the base station may receive a ranging signal from the mobile station and determine, based on the ranging information and the ranging signal, whether or not to allow the first relay station to relay the mobile station.

Yet another embodiment of the present invention provides a control information receiving method of a base station that receives control information on a mobile station through relaying of a relay station, wherein the base station receives a periodic resource allocation request of the relay station, the base station allocates a first resource having a first period with respect to first control information to the relay station, and the base station allocates a second resource having a second period that is shorter than the first period with respect to second control information that has higher sensitivity to time delay than the first control information to the relay station.

Still another embodiment of the present invention provides a method of transmitting control information on a mobile station to a base station, including requesting the base station to allocate a periodic resource, being allocated a first resource having a first period with respect to first control information by the base station, and being allocated a second resource having a second period that is shorter than the first period with respect to second control information that has higher sensitivity to time delay than the first control information by the base station.

Advantageous Effects

According to embodiments of the present invention, a base station allocates a dedicated resource to a relay station in advance before control information is generated in the relay station, so that the relay station can transmit the control information to the base station with a minimum of time delay. Accordingly, it is possible to efficiently transmit various types of control information in an initial ranging procedure, a relay path switching procedure, or the like.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. In addition, for clarifying the present invention, portions that are not directly related to the description are omitted in the drawings. Like reference numerals designate like elements throughout the specification.

In the specification, it should be noted that a phrase that a portion "includes" an element means that the other element is not excluded but it can be further included therein if a particularly contrary phase is not disclosed. In addition, it should be noted that terms "unit", "member", or "module" disclosed in the specification denote a unit for performing at least one function or operation, and it can be implemented in combination of hardware, software, or hardware and software.

As used in this application, a mobile station (MS) may be referred to as, and include some or all the functionality of, a terminal, a mobile terminal (MT), a subscriber station (SS), a portable subscriber station (PSS), a user equipment (UE), an access terminal (AT) or some other terminology.

As used in this application, a base station (BS) may be referred to as, and include some or all the functionality of, an access point (AP), a radio access station (RAS), a node B, a base transceiver station (BTS), a mobile multihop relay-base station (MMR-BS) or some other terminology.

In the specification, a relay station may perform relaying between a mobile station and a base station, between a mobile station and a relay station, between a base station and a relay station, or between a relay station and another relay station.

Figure 4:
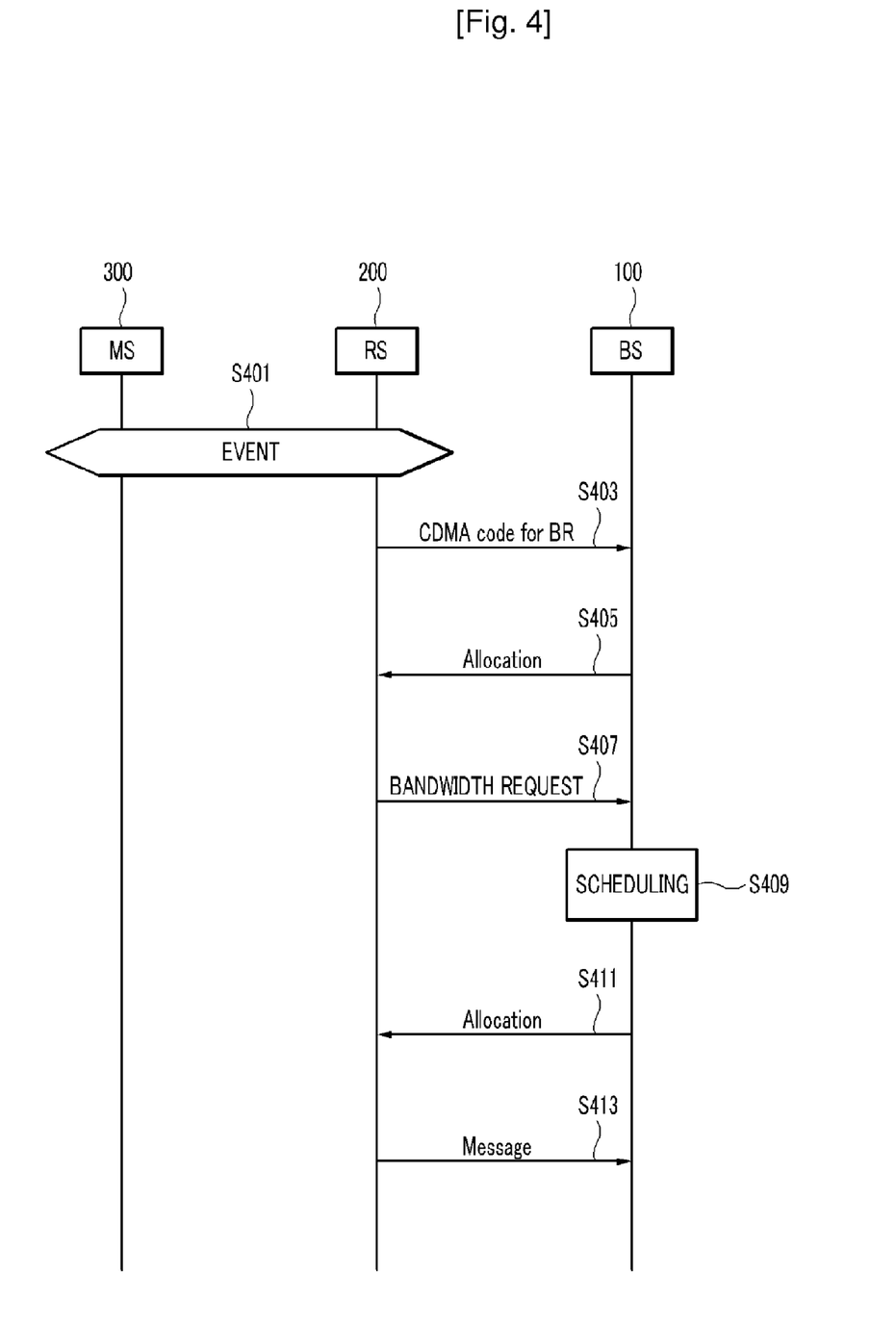
FIG. 4 is a flowchart illustrating a procedure according to an embodiment of the present invention where a relay station transmits control information.

FIG. 4 is a flowchart illustrating a procedure according to an embodiment of the present invention where a relay station transmits control information.

Referring to FIG. 4, a relay station 200 transmits control information based on contention.

Firstly, when control information that is to be transmitted to a base station 100 is generated (S401), the relay station 200 transmits, to the base station 100, a code division multiple access (CDMA) code for request of a resource for request of bandwidth, by using a random access scheme (S403).

When the base station 100 receives the CDMA code from the relay station 200, the base station 100 allocates a resource through uplink map information to the CDMA code that is received (S405).

The relay station 200 requests allocation of resource (bandwidth) for transmission of the control information to the base station 100 through the resource allocated to the CDMA code (S407).

The base station 100 performs scheduling to allocate the resource for transmission of the control information (S409) to the relay station 200 and notifies the relay station 200 of the information on the allocated resource through the uplink map (S411).

The relay station 200 transmits the control information to the base station 100 through the allocated resource (S413).

According to the control information transmission scheme based on the contention shown in FIG. 4, the base station 100 allocates the resource to the relay station 200 only in the case where the control information that the relay station 200 is to transmit is generated. Therefore, the radio resource can be efficiently used. However, since the CDMA code used for the resource allocation request is transmitted through the random access channel, a conflict may occur between CDMA codes. If the conflict occurs, the relay station 200 needs to re-transmit the CDMA code. Accordingly, in a case where the control information that is sensitive to time delay is transmitted, system performance may be degraded.

Figure 5:
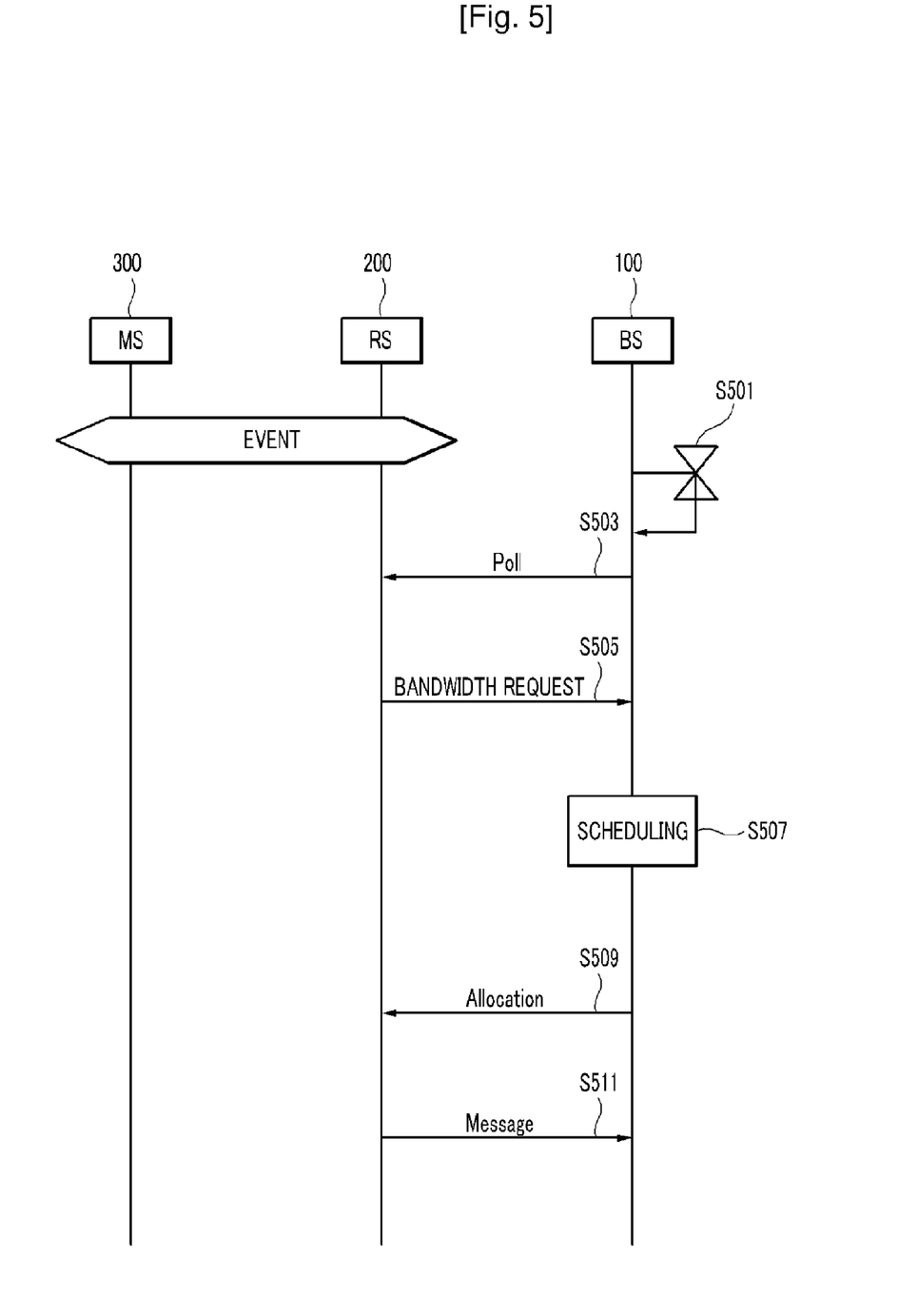
FIG. 5 is a flowchart illustrating a procedure according to another embodiment of the present invention where a relay station transmits control information.

FIG. 5 is a flowchart illustrating a procedure according to another embodiment of the present invention where a relay station transmits control information.

Referring to FIG. 5, the relay station 200 transmits the control information based on polling.

Firstly, when a polling interval arrives (S501), the base station 100 periodically polls the relay station 200 (S503). In FIG. 5, the polling denotes a process where the base station 100 allocates a resource to the mobile station 300 or the relay station 200 without a request from the mobile station 300 or the relay station 200. During the polling, the base station 100 allocates a resource of which amount is suitable for transmission of a media access control (MAC) header. Therefore, the mobile station 300 or the relay station 200 needs to be allocated with a resource of which amount is suitable for transmission of a payload in order to transmit a packet.

The polled relay station 200 requests the base station 100 to allocate the resource (bandwidth) for transmission of the control information (S505).

The base station 100 performs scheduling to allocate the resource for transmission of the control information to the relay station 200 (S507) and notifies the relay station 200 of information on the allocated resource through the uplink map (S509).

The relay station 200 transmits the control information to the base station 100 through the allocated resource (S511).

Since there is no possibility of collision in the control information transmission scheme based on the polling, the control information transmission scheme based on the polling has higher reliability than the control information transmission scheme based on the contention. However, in a case where the control information that is to be transmitted with a minimum of time delay is continually generated, the time delay in transmitting control messages which can be caused by the polling interval as well as by the time delay for resource allocation following the request for resource allocation may degrade the system performance.

Figure 6:
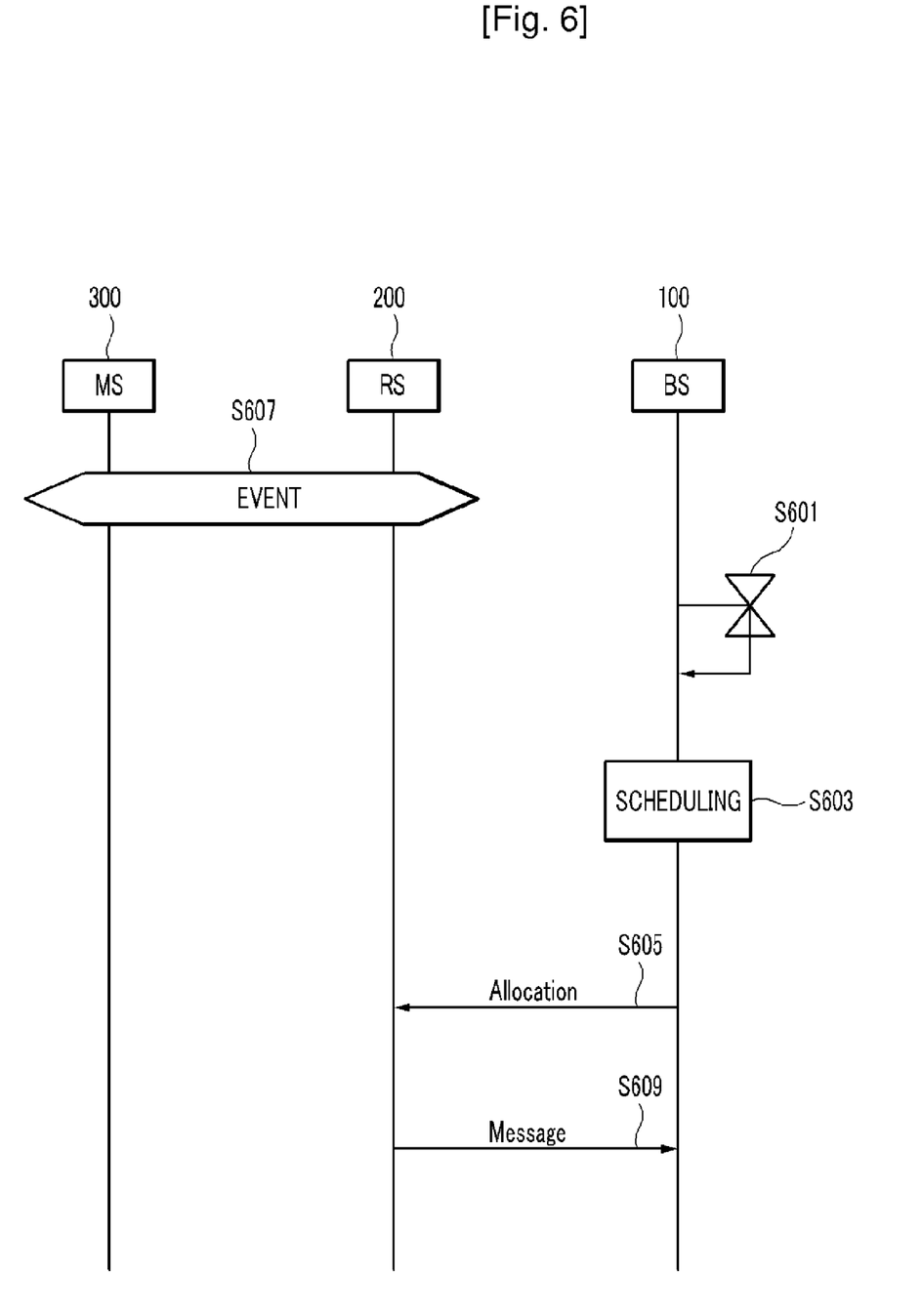
FIG. 6 is a flowchart illustrating a procedure according to still another embodiment of the present invention where a relay station transmits control information.

FIG. 6 is a flowchart illustrating a procedure according to still another embodiment of the present invention, where a relay station transmits control information.

Firstly, when a resource allocation interval arrives (S601), the base station 100 performs scheduling periodically (S603) and allocates the resource for transmission of the control information to the relay station 200 (S605).

When the control information that is to be transmitted to the base station 100 is generated (S607), the relay station 200 transmits the control information through the allocated resource to the base station 100 (S609).

Referring to FIG. 6, since the relay station 200 acquires a hotline such as a dedicated control channel (DCH) with respect to the base station 100, in a case where to-be-transmitted control information is generated, the relay station 200 can transmit the control information to the base station 100 without an additional resource allocation request (or bandwidth allocation request) and a time delay associated with the resource allocation (or bandwidth allocation). At this time, the base station 100 may identify the relay station and the mobile station that operate within the cell of the base station 100 to allocate the dedicated control channel to the relay station 200 without an explicit request. In addition, the relay station 200 may request the base station 100 to allocate the dedicated control channel in the form of a periodic resource allocation, and the base station 100 may allocate the dedicated control channel to the relay station 200 in response to the request. If needed, the relay station 200 requests the base station 100 to increase, decrease, or release a bandwidth of the allocated dedicated control channel. Alternatively, if needed, the base station 100 may increase, decrease, or withdraw the dedicated control channel allocated to the relay station 200 without request of the relay station 200.

The control information may be classified into "control information having a high occurrence frequency or high sensitivity to transmission time delay" and "control information having a low occurrence frequency or low sensitivity to transmission time delay." The base station 100 may use a dual allocation scheme for allocating a dedicated control channel having a short period for transmission of the control information having a high occurrence frequency or high sensitivity to transmission time delay and a dedicated control channel having a long period for transmission of the control information having a low occurrence frequency or low sensitivity to transmission time delay.

Figure 7:
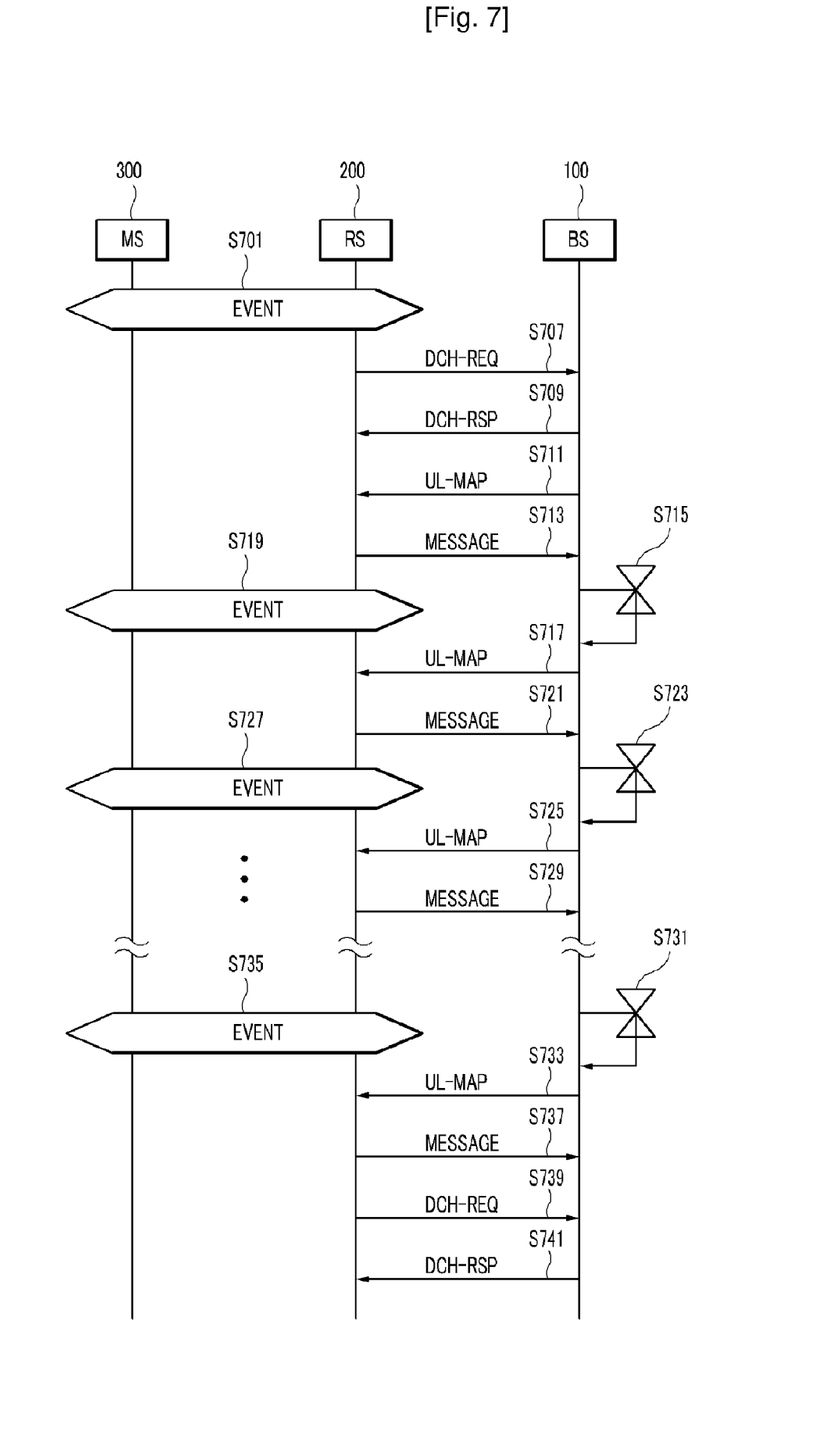
FIG. 7 is a flowchart illustrating a procedure according to further still another embodiment of the present invention where a relay station transmits control information.

FIG. 7 is a flowchart illustrating a procedure according to further still another embodiment of the present invention where a relay station transmits control information.

Firstly, when the relay station 200 detects an event associated with the mobile station 300 (S701), the relay station 200 requests the base station 100 to allocate a resource required for relaying the mobile station 300 (S707). At this time, the relay station 200 may request the base station 100 to periodically allocate the resource. Alternatively, through a dedicated control channel allocation request (DCH-REQ) message, the relay station 200 may request the base station 100 to allocate a dedicated control channel used for relaying the mobile station 300. Since the DCH-REQ message includes a payload as well as a header, the relay station 200 may use the contention shown in FIG. 4 or the polling shown in FIG. 5 so as to be allocated a resource or a bandwidth for transmission of the DCH-REQ message.

The base station 100 performs scheduling in response to the resource allocation request of the relay station 200 to allocate the requested resource to the relay station 200 (S709). At this time, the relay station 200 may transmit a dedicated control channel allocation response (DCH-RSP) message so as to be allocated the resource. After the base station 100 allocates the resource to the relay station 200, the base station 100 periodically broadcasts uplink map information (S711, S717, S725, and S733). Namely, when an uplink map information transmission interval arrives (S715, S723, and S731), the base station 100 broadcasts the uplink map information.

When the control information that is to be transmitted to the base station 100 is generated due to the occurrence of an event (S701, S719, S727, and S735), the relay station 200 analyzes uplink map information so as to locate a position of the resource allocated to the relay station 200, and then transmits the control information to the base station 100 through the allocated resource (S713, S721, S729, and S737). At this time, the relay station 200 may transmit the "control information having a high occurrence frequency or high sensitivity to transmission time delay" through the dedicated control channel having a short period and the "information having a low occurrence frequency or low sensitivity to transmission time delay" through the dedicated control channel having a long period.

If the mobile station 300 switches a relay path to the relay station 200 into a relay path to another relay station, the dedicated control channel allocated to the relay station 200 may not be needed. In this case, the relay station 200 transmits the DCH-REQ message to the base station 100 so as to release the allocated dedicated control channel (S739).

The base station 100 transmits a DCH-RSP message to the relay station 200 to respond to the DCH-REQ message (S741).

On the other hand, even in a case where there is no request of the relay station 200, the base station 100 may withdraw the dedicated control channel allocated to the relay station 200 or decrease an amount of the resource allocated to the relay station 200.

In the embodiment shown in FIG. 7, when the mobile station 300 switches the relay path, the base station 100 allocates a resource to the relay station 200 in advance. Therefore, when the control information is generated, the relay station 200 can transmit the control information to the base station 100 with a minimum of delay time without an additional resource allocation procedure.

Figure 8:
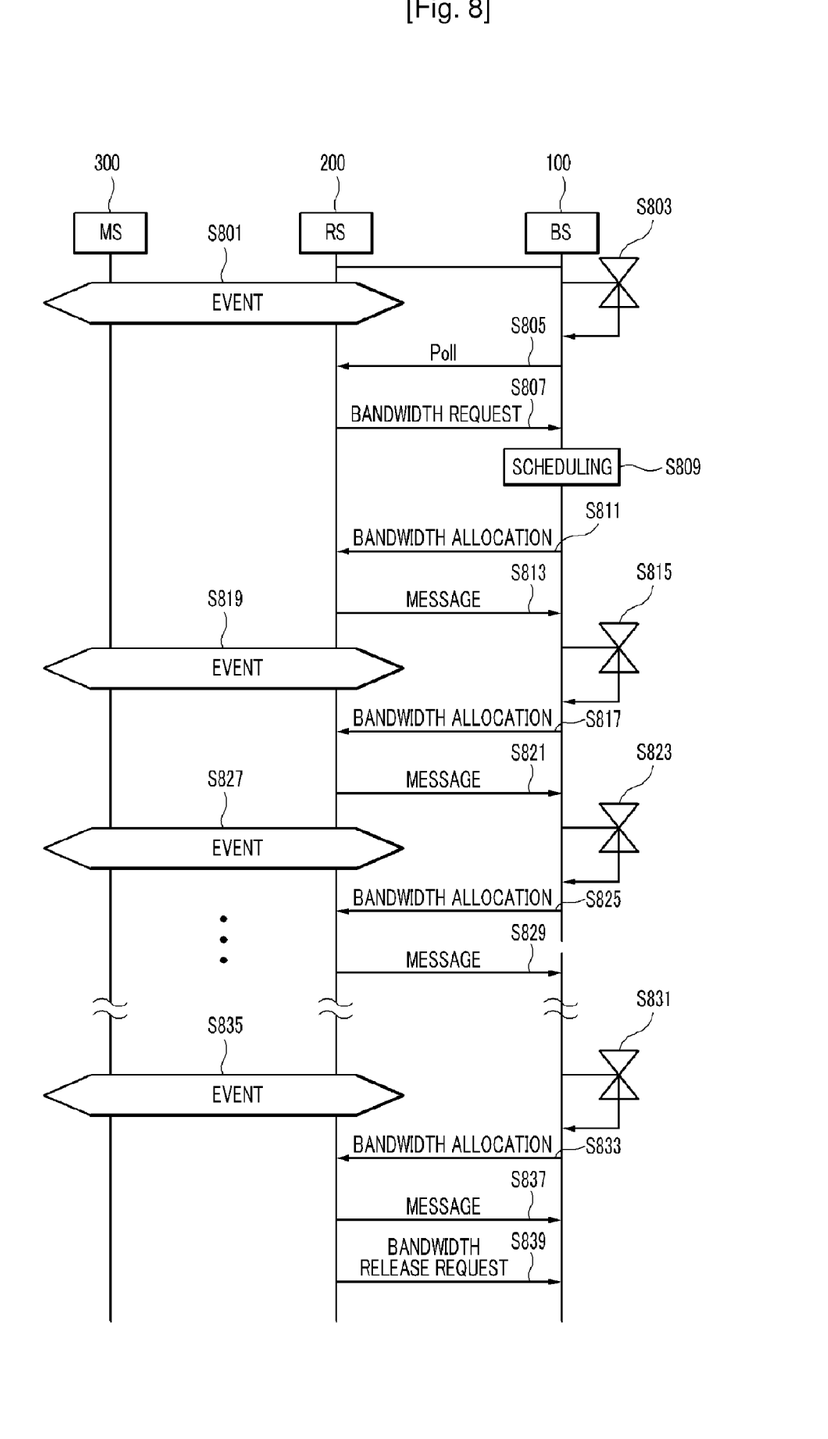
FIG. 8 is a flowchart illustrating a procedure according to yet another embodiment of the present invention where a relay station transmits control information.

FIG. 8 is a flowchart illustrating a procedure according to yet another embodiment of the present invention where a relay station transmits control information.

Firstly, when the relay station 200 detects an event associated with the mobile station 300 (S801), the relay station 200 waits for the time when the base station 100 polls the relay station 200 (S803). At this time, the relay station 200 can detect the mobile station 300 that approaches a coverage area of the relay station 200 as the event associated with the mobile station 300.

When a polling interval arrives, the base station 100 polls the relay station 200 (S805).

When the base station 100 polls the relay station 200, the relay station 200 requests the base station 100 to allocate the bandwidth required for relaying the mobile station 300 (S807). At this time, the relay station 200 may request the base station 100 to periodically allocate the bandwidth.

On the other hand, in the embodiment shown in FIG. 8, the relay station 200 may request the base station 100 to allocate the bandwidth required for relaying the mobile station 300 based on the contention. Namely, the relay station 200 transmits a CDMA code for bandwidth request in a random access scheme to the base station 100. When the base station 100 receives the CDMA code, the base station 100 allocates, to the CDMA code, a resource of which amount is suitable for transmission of a bandwidth request header and broadcasts a map notifying of the resource allocation. At this time, the relay station 200 that transmits the CDMA code may analyze the received map, so that the relay station 200 can be notified that the relay station 200 is allocated the resource as a response to the CDMA code that the relay station 200 transmits. Subsequently, the relay station 200 may transmit the bandwidth request header through the allocated resource to the base station 100 (S807) so as to request that the base station 100 allocate a dedicated uplink resource.

The base station 100 performs scheduling according to the bandwidth request of the relay station 200 (S809), and then allocates the requested bandwidth to the relay station 200 (S811).

Next, when a bandwidth allocation interval arrives (S815, S823, and S831), the base station 100 allocates a bandwidth to the relay station 200 (S817, S825, and S833).

When the control information that is to be transmitted to the base station 100 is generated due to the occurrence of an event (S801, S819, S827, and S835), the relay station 200 transmits the control information to the base station 100 through the allocated bandwidth (S813, S821, S829, and S837). At this time, the relay station 200 may transmit the "control information having a high occurrence frequency or high sensitivity to transmission time delay" through the dedicated control channel having a short period and the "information having a low occurrence frequency or low sensitivity to transmission time delay" through the dedicated control channel having a long period.

If the mobile station 300 finishes change of a relay path to another relay station except the relay station 200 not to need the bandwidth allocated to the relay station 200, the relay station 200 releases the allocated bandwidth (S839).

On the other hand, even in a case where there is no request of the relay station 200, the base station 100 may decrease or withdraw the bandwidth allocated to the relay station 200.

In the embodiment shown in FIG. 7, when the mobile station 300 switches the relay path, the base station 100 allocates a resource to the relay station 200 in advance. Therefore, when the control information is generated, the relay station 200 can transmit the control information to the base station 100 with a minimum of delay time without an additional resource allocation procedure.

Figure 9:
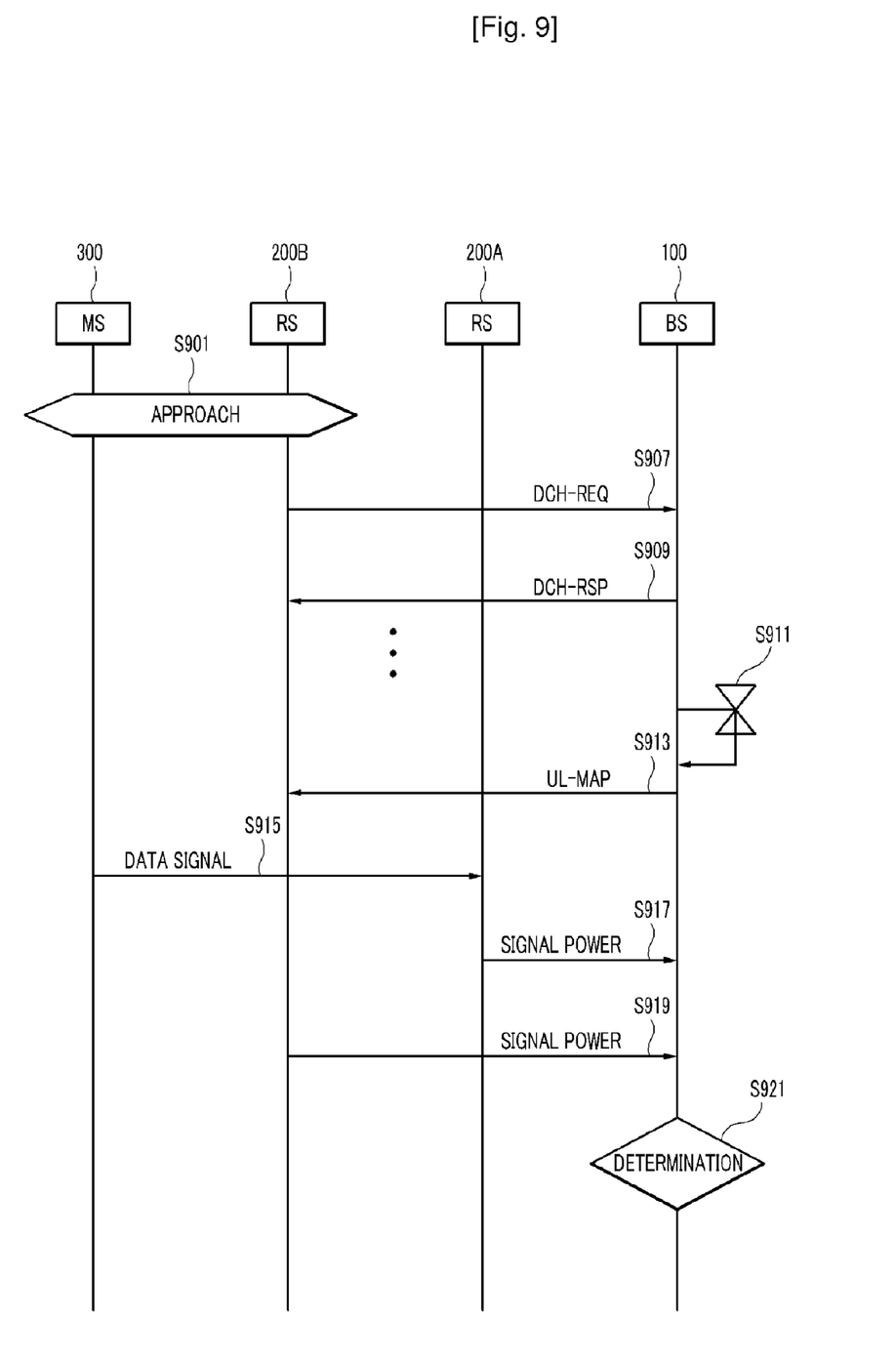
FIG. 9 is a flowchart illustrating a relay path switching procedure according to an embodiment of the present invention.

FIG. 9 is a flowchart illustrating a relay path switching procedure according to an embodiment of the present invention.

In the embodiment shown in FIG. 9, it is assumed that the mobile station 300 is provided with a service by a relay station 200A and the mobile station 300 approaches a coverage area of a relay station 200B.

Firstly, when the relay station 200B detects the mobile station 300 that approaches the coverage area of the relay station 200B (S901), the relay station 200B requests the base station 100 to allocate a resource or a bandwidth required for relaying to the mobile station 300 (S907). At this time, the relay station 200B may request the base station 100 to periodically allocate the resource. Alternatively, through a dedicated control channel allocation request (DCH-REQ) message the relay station 200B may request the base station 100 to allocate a dedicated control channel used for relaying the mobile station 300. Since the DCH-REQ message includes a payload as well as a header, the relay station 200B may use the contention shown in FIG. 4 or the polling shown in FIG. 5 so as to be allocated with a resource or a bandwidth for transmission of the DCH-REQ message.

The base station 100 performs scheduling in response to the resource allocation request of the relay station 200B to allocate the requested resource to the relay station 200B (S909). At this time, the relay station 200B may transmit a dedicated control channel allocation response (DCH-RSP) message so as to be allocated the resource.

After the base station 100 allocates the resource to the relay station 200B, the base station 100 periodically broadcasts uplink map information (S913). Namely, when an uplink map information transmission interval arrives (S911), base station 100 broadcasts the uplink map information (S913).

When the relay station 200B can receive a data signal transmitted from the mobile station 300 due to the approach of the mobile station 300 (S915), the relay station 200B transmits the control information including power of the received signal through the resource according to the uplink map information to the base station 100 (S919).

On the other hand, since the relay station 200A currently serves the mobile station 300, the relay station 200A also transmits the control information including power of a received signal to the base station 100 through the resource corresponding to the uplink map information.

The base station 100 compares the control information transmitted from the relay station 200A with the control information transmitted from the relay station 200B to determine whether or not to switch the relay path to the relay station 200A into the relay path to the relay station 200B. More specifically, if the power of the received signal transmitted from the relay station 200B is higher than the power of the received signal transmitted from the relay station 200A, the base station 100 determines to switch from the relay path to the relay station 200A to the relay path to the relay station 200B.

Alternatively, the base station 100 may directly receive the data signal from the mobile station 300. In this case, the base station 100 additionally compares power of the received data signal to determine whether to communicate with the mobile station 300 through the relay station 200A or 200B or to directly communicate with the mobile station 300.

Figure 10:
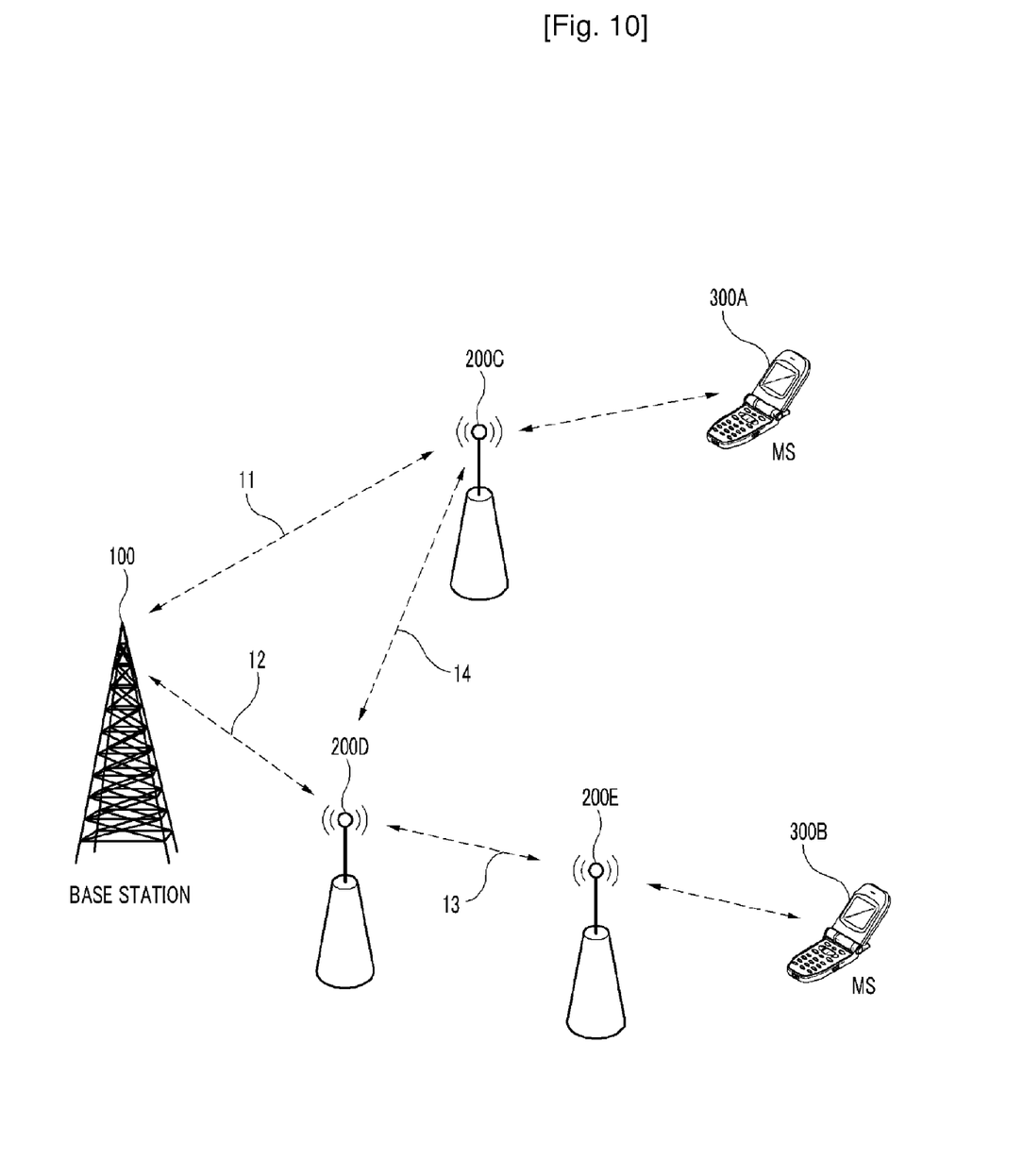
FIG. 10 is a view illustrating a configuration of a network according to an embodiment of the present invention.

FIG. 10 is a view illustrating a configuration of a network according to an embodiment of the present invention.

Referring to FIG. 10, a mobile station 300A communicates with the base station 100 through a relay station 200C. A mobile station 300B communicates with the base station 100 through a relay station 200E and a relay station 200D. In this case, an efficient exchange of the control information between the relay stations is needed. Therefore, the base station 100 may additionally allocate a dedicated control channel 14 for exchange of the control information between the relay stations 200C and 200D as well as dedicated control channels 11, 12, and 13 for management of paths for directly connecting the mobile stations 300A and 300B to the base station 100.

Exemplary embodiments of the present invention can be implemented not only through the aforementioned method and/or apparatus but also through computer programs executing functions in association with the structures of the exemplary embodiments of the present invention or through a computer readable recording medium having embodied thereon the computer programs. The present invention can be easily implemented by those skilled in the art by using the above descriptions according to the exemplary embodiments.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

The invention claimed is:

1. A relaying method of a first relay station that relays between a mobile station and a base station, comprising:
   when an event associated with the mobile station occurs, requesting the base station to allocate a resource required for transmitting control information on the mobile station to the base station; and
   when the control information on the mobile station is generated, transmitting the control information to the base station through the resource,
   wherein the event is the mobile station approaching the first relay station,
   wherein the requesting the base station to allocate the resource comprises: requesting the base station to periodically allocate the resource; and
   in a case where the mobile station changes a relay path from the first relay station to a second relay station, releasing the resource to the base station.

2. A method of transmitting control information on a mobile station to a base station, comprising:
   requesting the base station to allocate a periodic resource;
   being allocated a first resource having a first period with respect to first control information by the base station;
   being allocated a second resource having a second period that is shorter than the first period with respect to second control information that has higher sensitivity to time delay than the first control information by the base station
   transmitting the first control information to the base station through the first resource; and
   transmitting the second control information to the base station through the second resource.

* * * * *